United States Patent [19]

Fremont

[11] 4,303,533
[45] Dec. 1, 1981

[54] METHOD OF REMOVING FINE SUSPENDED SOLIDS FROM EFFLUENT STREAMS

[75] Inventor: Henry A. Fremont, Wyoming, Ohio

[73] Assignee: Champion International Corporation, Stamford, Conn.

[21] Appl. No.: 154,800

[22] Filed: May 30, 1980

[51] Int. Cl.³ .............................................. B01D 25/08
[52] U.S. Cl. .................................................... 210/791
[58] Field of Search ................. 162/29, 189; 210/767, 210/791, 350, 351, 407, 408, 413, 806

[56] References Cited

U.S. PATENT DOCUMENTS 3,758,405 9/1973 Fremont ................................. 162/29
4,212,737 7/1980 Daucher et al. ...................... 210/791

Primary Examiner—Ivars C. Cintins
Attorney, Agent, or Firm—Evelyn M. Sommer

[57] ABSTRACT

The method of removing fine suspended solids from an effluent stream comprising passing said stream through at least two contiguous layers of an open-celled compressible hydrophobic polymeric material and compressing said layers to remove the solids loaded therein to regenerate said material, said material being layered so that the open cells of each layer are randomly oriented.

14 Claims, 2 Drawing Figures

METHOD OF REMOVING FINE SUSPENDED SOLIDS FROM EFFLUENT STREAMS

BACKGROUND OF THE INVENTION

This invention relates to a process for removing suspended solids from waste water streams, particularly primary and secondary effluents from municipal sources or industrial processes such as paper mills and vegetable canning operations. It is more particularly directed to the filtration of fine suspended solids from effluents resulting from paper processing, notably white water effluents and secondary effluents from such processes.

Filtration has long been a major method of removing solids from liquid streams. In waste water treatment, the removal of suspended solids is a difficult task, and several filtration means have been employed to deal with these removal problems. Sand filters and multi-media filters have been widely used for some applications. Work in the field has shown these filters to be generally effective in removing suspended solids, but only from streams of low suspended solids content and at relatively low flow rates through the filters. In general, solids concentration of the stream to the filter must be below about 200 milligrams/liter. Suspended solids concentration values above this level tend to lead to filtration bed clogging and high pressure drop across the bed. Thus, the application of sand or multi-media filters is limited to certain effluent streams. The restriction of low flow rates also precludes their use on high volume municipal or industrial waste water streams.

Efforts to use other materials, such as solid or foam polymeric materials, to remove suspended solids has been limited to use of discontinuous particles. Here again deep beds of solid or foam polymeric particles were used and removal of suspended solids was mainly accomplished by physical entrapment of the suspended solids on the polymeric particles at some point in the deep bed. Plugging of the bed, pressure drops, and/or low flow rates also characterized these efforts. In addition, there is the problem of foam particles being thrown out of the bed during backwashing. One attempt to overcome this problem is described in U.S. Pat. No. 4,162,216 which uses mechanical agitation to remove the suspended solids from the foam particles.

In the past, filtration using layers of polymeric foam, such as polyurethane foam, has been limited primarily to the separation of oil from water. The oleophilic nature of the foam and the tendency of oil to coalesce on the foam have made polyurethane foams especially useful for this type of separation process. Such processes are taught, for example, in Grutsch, U.S. Pat. No. 3,608,727, Johnson et al, U.S. Pat. No. 3,617,551, and De Young, U.S. Pat. No. 3,888,766. Teitsma, U.S. Pat. No. 3,334,042 teaches that carbon particles can be agglomerated with liquid hydrocarbons and then separated out from a water phase using various polymer foams. And in a paper entitled "A Filter-Coalescer Device For Oil-Water Separation" prepared for presentation at the Sixth Annual Offshore Technology Conference in Houston, Tex., in May, 1974, and authored by Arye Gollan and Daniel H. Fruman, there is disclosed a system for separating oil from water using polyurethane foam. The paper notes that, along with oil retention, there is some accompanying solids retention. It is clear, however, from the disclosures of U.S. Pat. No. 3,334,042 and the Gollan and Fruman paper that the separation using polyurethane foams is a liquid-liquid separation, not a liquid-solid separation.

SUMMARY OF THE INVENTION

The process of this invention overcomes the prior art problems and provides effective suspended solids removal in shallow beds of certain types of foamed polymeric material at relatively high flow rates.

Briefly, the present invention comprises the method of removing fine suspended solids from an effluent stream comprising passing said stream through at least two contiguous layers of an open-celled compressible hydrophobic polymeric material and compressing said layers to remove the solids loaded therein to regenerate said material, said material being layered so that the open cells of each are randomly oriented.

DETAILED DESCRIPTION

Figure 1:
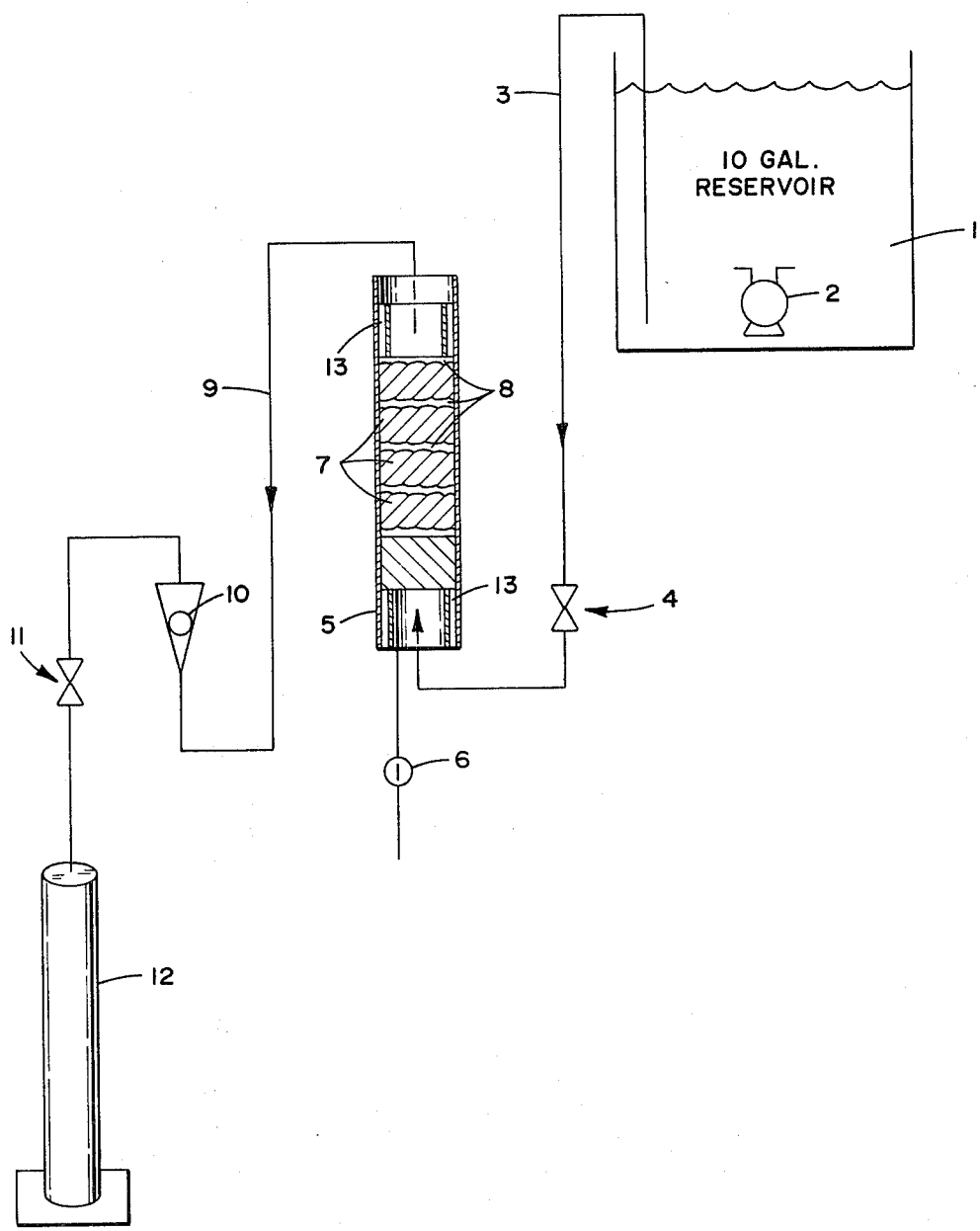
FIG. 1 is a schematic view of the apparatus used in Example 1.

The most critical aspects of the present invention are the use of certain open-celled compressible hydrophobic polymeric materials and the use of that material in layers that are randomly oriented to form the filter medium.

As to the open-celled compressible hydrophobic polymeric material, suitable are foams made of polyurethane, a styrene-butadiene rubber, or a foam rubber. Most suitable and preferred are polyurethane foams and in particular reticulated polyester-type polyurethane foams, and the invention will be further described in connection therewith.

In like manner, while the instant invention can be used to remove fine suspended solids from a wide variety of municipal and industrial effluent streams, it will be described in connection with removal of fine suspended solids from paper mill effluent streams.

The use of polyurethane foam as a filtration medium provides numerous operating advantages over beds employing sand or multi-media filtration materials. These advantages include: high solids loading capacity, high flow rate capability, low bed pressure drops, resistance to plugging (owing to the very open matrix of the foam), and general applicability of the process to a wide variety of streams. It is also superior to the use of foam particles in that it eliminates the backwashing problems and avoids the use of mechanical agitation means. As to all these prior separation means, it is also more desirable because the higher flow rates permit the use of reduced filter area and thereby significant cost savings.

The suspended solids content of a secondary effluent from a paper mill is from about 20 to about 80 ppm, or higher. The process of this invention is applicable to streams with solids content in this range and higher. Such suspended solids comprise a large percentage of suspended solids below 100 microns in length, width, or thickness. Some are as low as 0.5 microns or smaller. It is a unique aspect of the present method that it can remove such fines in addition to the larger size suspended solids. As used herein, the phrase "removing fine suspended solids" means removal of both the fines and the larger size suspended solids.

The polyurethane foam preferably used is reticulated polyester-type polyurethane foam; foam from which the remaining windows have been removed to give a substantially completely open network. The polyurethane material itself occupies only 5% of the volume, leaving 95% of the volume open for flow of liquids. This leads to a very low pressure drop head loss during filtration. The holes within the foam are about 200-300 times the size of the particles to be removed.

There are two general methods of foam reticulation. These two methods are (1) electrically zapping the foam to give "Z"-type foam and (2) chemically etching out the remaining windows to give quenched or "Q"-type foam. The "Q"-type foam gives better results in the practice of this invention than does the "Z"-type foam. The differences between the foam types appear to be surface area differences and necessary run time to reach "steady state" operation. "Q"-type foam requires less time to reach "steady state". The "Q"-type foam also has slightly greater surface area than the "Z"-type foam. Important to the efficiency of the process of this invention are the requirements that the foam have a large surface area. An increase in internal foam surface area will generally lead to better suspended solids removal. A 60 ppi (pores per lineal inch) foam has a surface area of 1200 ft$^2$ per cubic foot of foam, while a 100 ppi foam has a surface area of 2200 ft$^2$ per cubic foot of foam. Therefore, 100 ppi foam will remove more suspended solids than an equivalent depth of 60 ppi foam. Preferred, in fact, are foams having from 60 to 100 ppi. However, increased surface area does not lead to higher solids removal efficiency if microeddy formation is decreased at the same time. Microeddies are not only a result of the open pore network, but of the random layering of polyurethane foams as more fully set forth below.

The depth of the foam bed can be quite shallow. Depths greater than eight inches of foam lead to no improvement in filtration efficiency. For example, tests conducted with six and eight inches of foam showed only a slight improvement in filtration effectiveness with increased depth. Further increases in depth do not lead to improvement in removal efficiency.

What is critical and important for efficiency is the use of at least two layers of the polyurethane foam, one having cells with a pore size larger than the other layer or layers and that the layers be randomly oriented so that the pores of one layer are displaced from those of the adjoining layer or layers. This provides a more tortuous path for the effluent flowing through the layers. This results in greater turbulence, increased microeddies, and better filtration. Within this framework it is preferred to have a foam layer with a large pore size at the inflow and of the filter bed followed by a layer of foam with a smaller pore size. It is best to have more than two layers of foam and the Examples below illustrate a wide combination of foam layers and foam filter bed thickness. The individual layers of polyurethane foam can very widely in thickness, with optimum thickness being about two inches.

The effluent stream from which the suspended solids are to be separated is made to flow through the foam at the desired flow rate. This is accomplished by various methods known in the art such as, for example, by pumping the stream, either in an upward or downward direction, when the foam is held in a reactor, or by immersion of the foam into the stream, as one might have on a vacuum or drum-type washer. The solids-depleted liquid is collected for reuse, or in the case of filtration or secondary effluent, can be put directly back into the water source. Ninety-nine percent of the retained solids can be recovered by simple squeezing of the foam.

Foam filtration is able to reduce secondary effluent suspended solids to below 10 ppm for run times exceeding 17 hours, at which time "breakthrough" is achieved. Such results are achieved at a flow rate of 10 to 15 gfm or higher (gallons per minute per square foot of bed cross sectional area). Breakthrough is defined as the filtrate suspended solids value being the same as the feed suspended solids level. Typically, in paper mill secondary effluents, a solids loading level of two pounds per cubic foot of foam can be achieved before breakthrough. It should be noted that breakthrough does not imply filter plugging; rather it is the point at which the foam no longer removes suspended solids and must be squeezed to be regenerated.

The high efficiency of polyurethane foam in removing suspended solid particles according to the process of this invention is believed to be due to a mechanism which is quite different from the mechanism of oil-water separations. The removal of suspended solids by foam is a function of electrostatic, inertial and hydraulic forces. Without wishing to be bound by any particular theory, it is believed that the interaction of these forces determines the removal effectiveness.

The bonds holding the suspended solids to the wall of the foam are easily broken by squeezing the foam, indicating only weak bonding. This bonding may be weak electrostatic attraction, Van Der Waals forces and/or secondary hydrogen bonding.

Calculations of the mean free path and number of collisions of particles with each other show the importance of wall collisions for effective removal. Thus, the mechanism is one of attachment to the wall first, with agglomeration second, rather than vice versa. Scanning electron micrographs show the foam to be a three dimensional interconnected network of open cells. This structure leads to increased particle-wall collisions due to inertial effects via the formation of microeddies.

The thickness of the particle layer on the foam wall is believed to be limited to about 5 $\mu$m. This points to the role of the wall as an electrostatic collector, as well as an inertial separator. The foam surface becomes positively charged as the water flows through the foam structure, creating sites for the negatively charged particles. This charge is most likely dissipated through the 5 $\mu$m layer of particles, until there is no longer an electrostatic attraction at the outer edge.

The two common types of polyurethane foam are ester type and ether type. For suspended solids removal, the ester-type foam is more effective than ether-type foam. This is most likely due to the ability of an ester to become more positively charged than an ether. The higher charge would aid in the electrostatic attraction of the negatively charged suspended solids.

Hydrophobic foam, rather than hydrophilic foam, is necessary for effective suspended solids removal. During filtration, a hydrophilic foam has a water film on its surface, which prohibits the aqueous streaming potential from polarizing the foam cell wall and hence the development of the positive charge. Thus, the foam rubber or styrene-butadiene foam used in place of the polyurethane must be hydrophobic, as well as have the open cell characteristics and electrostatic charge potential discussed above with respect to the polyurethane.

The flow rate attainable with the process of this invention is quite high in comparison to general filtration techniques. Flow rates of up to 20 gfm or more can be attained in the removal of fine suspended solid particles from secondary effluents in paper mill processing.

This invention will be further described in connection with the following Examples, which are included here for illustrative purposes only and are not intended to be limitations.

In Example 1, a schematic representation of the test system used is shown in FIG. 1. The feed solution was fed from a 10 gallon reservoir 1 equipped with submersible pump 2 for mixing. The feed was drawn by gravity via line 3 having a valve 4 into the bottom of a 2⅜" diameter filtration column 5 with some settling of the suspended solids occurring before the liquid actually reached the filters. To account for this settling, feed samples are taken from feed sampling port 6 as close to the inlet of the foam filters as possible. The column was packed with a plurality of layers of polyurethane foam 7. In FIG. 1, there is shown a single coarse layer (60 ppi) followed by four finer foam layers (100 ppi). This arrangement was used in the following Example 1, but was varied for the subsequent examples as described therein. The foam layers were separated by polyethylene screens 8 having ¼ inch openings. Rings 13, cut out of polyvinyl chloride pipe, were used to hold the filter in place.

The filtrate was drawn off via line 9 at the top of the column, through a flow meter 10, and valve 11, and collected in a 4 liter graduate 12. The filter flow rate was measured and adjusted with valves 4 and 11.

Figure 2:
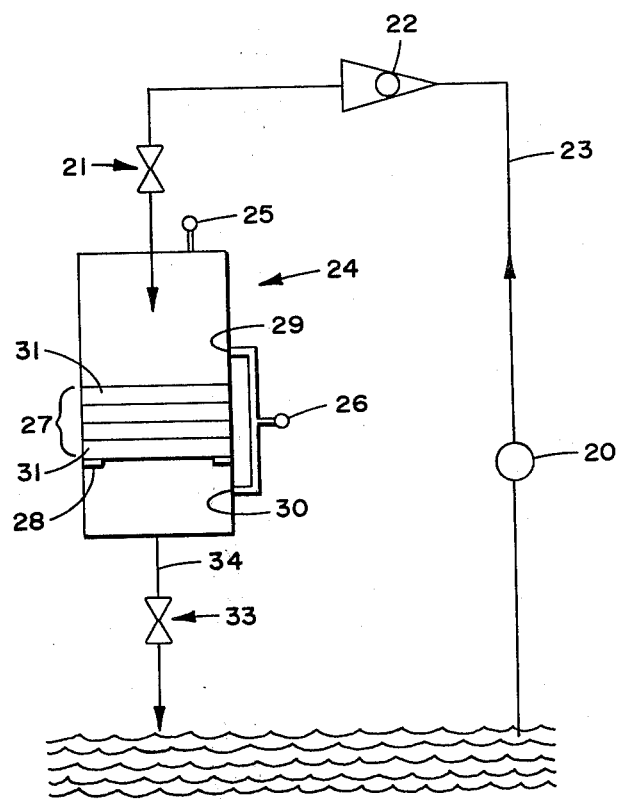
FIG. 2 is a schematic view of the apparatus used in the remaining Examples.

The apparatus used in Examples 2 to 10 is depicted schematically in FIG. 2. Pump 20 removed water from a river at a location right at the outfall from a secondary clarifier. Valve 21 and flow meter 22 were used to control the flow of this effluent through line 23 into the top of separator column 24. Separator column 24 was 11 inches in diameter and was provided with pressure gauge 25, manometer 26, filter matrix 27, and filter medium support 28. Manometer 26 was provided with pressure measuring parts 29 and 30 positioned, respectively, above and below filter matrix 27 to measure the pressure drop across the matrix. Support 28 used to support filter matrix 27 was an expanded metal disc 28 and matrix 27 consisted of foam layers 31. Valve 33 controlled flow of treated effluent from column 23 back into the river by means of line 34. The individual layers 32 of matrix 27 are described in Examples 2 to 10.

While the foregoing apparatus was used for purposes of further illustrating the present invention, the multilayer filter medium described in the present invention can be utilized in place of other filter media in conventional separation equipment such as vacuum drum filters, belt filters, disc filters, and plate and frame filters which can be provided with means to compress the filter medium when loaded to remove the suspended solids therefrom.

EXAMPLE 1

A number of tests were run with a secondary effluent from a paper mill. During all of these tests, the same 10 gallon feed solution was processed. Samples of the feed and filtrate were taken at 6000 milliliter intervals. When more than 30 liters of feed were processed, the feed reservoir 1 was allowed to empty, then was refilled with the processed filtrate and the run continued. Turbidity analysis of the samples was performed immediately. Suspended solids were determined by filtering the sample through 0.45μ filter paper.

Initially, a series of three runs were made. Loss of suspended solids due to sampling and handling procedures account for lower feed suspended solid loading found in successive test runs.

Feed and filtrate suspended solids concentration as a function of feed volume processed were measured for test runs 1, 2, and 3. These runs were all performed with a total filter length of six inches.

During run No. 1, the feed suspended solids was at its highest concentration with an average loading of 382 milligrams per liter. The filtrate suspended solids concentration remained relatively steady throughout the entire test run before rising to a maximum value of 110 milligrams per liter after 30 liters had been processed.

The suspended solids loading in the foam filter layers as a function of the center line filter depth for test runs 1, 2, and 3 was also noted and is set forth in Table I below. The data show that foam loading decreased with filter height. It is believed that the higher solids loading obtained at the lower flows are associated with the higher solids concentration in the feed.

Upon completion of the first three runs, the filter discs were compressed from six inches to a height of three inches and a fourth run with the same feed solution was performed. The feed and filtrate suspended solids concentration as a function of time for this run were also measured. The filtrate quality remains virtually constant throughout the 75 minute test. The average suspended solids rejected was 87%, while the suspended solids loading in the feed averaged 88 milligrams per liter. The suspended solids in the foam layer as a function of center line filter depth for this test was also noted. As with the six inch foam height for the other three runs, the coarse filter layer retained about 50% of the solids.

The following Table I summarizes the data obtained in this series of tests.

TABLE I

SUSPENDED SOLIDS REMOVAL EFFICIENCY AS A FUNCTION OF FEED VOLUME

| Test Run No. | Filter Length (inches) | Average Feed Suspended Solids-loading (mg/l) | Average Flow rate (gpm/ft$^2$) | Volume of Feed Processed (liters) | | | | |
|---|---|---|---|---|---|---|---|---|
| | | | | 6 | 12 | 18 | 24 | 30 |
| 1 | 6 | 382 | 1.7 | 84% | 85% | 85% | 81% | 73% |
| 2 | 6 | 197 | 3.4 | 66% | 84% | 85% | 79% | 84% |
| 3 | 6 | 109 | 6.8 | 60% | 67% | 72% | 77% | 76% |
| 4 | 3 | 90 | 1.7 | 87% | 88% | 89% | 88% | 81% |

These data show that polyurethane foam filters have removal efficiencies for secondary paper mill effluents of up to 85%.

EXAMPLE 2

Tests of secondary paper mill effluent having different suspended solids levels were run. The data are shown in the following Table II.

TABLE II

| Foam Matrix | Flow Rate (gfm) | Average Feed Suspended Solids | Average Filtrate Suspended Solids | Average Percent Removal |
|---|---|---|---|---|
| 2 inches each of 60/100/100/100 ppi (Z-type) | 10 | 30 ppm | 7 ppm | 77% |
| 2 inches each of 60/100/100/100 ppi (Z-type) | 10 | 59 ppm | 16 ppm | 73% |

These data show that the solids content of the effluent to be treated can vary over a wide range, with little impact on removal effectiveness.

EXAMPLE 3

Although both Q-type and Z-type of reticulated polyester polyurethane foams are effective for solids removal, better removal is obtained with the Q-type foam. This is shown by the data in the following Table III.

TABLE III

| Foam Matrix | Flow Rate (gfm) | Average Feed Suspended Solids | Average Filtrate Suspended Solids | Average Percent Removal |
|---|---|---|---|---|
| 6 inches 80 ppi Q | 10 | 52 ppm | 7 ppm | 87% |
| 6 inches 80 ppi Z | 10 | 52 ppm | 32 ppm | 38% |

The better results with the Q-type foam are believed to be due to the increased surface area of the Q-foam.

EXAMPLE 4

As discussed above, the relationship of internal foam surface area and the number of microeddies in the polyurethane foam are both important factors in the efficiency of solids removal. Other things being equal, a 100 ppi foam will, for example, remove more suspended solids than an equivalent depth of 60 ppi foam, as shown in the following Table IV.

TABLE IV

| Foam Matrix | Flow Rate (gfm) | Average Feed Suspended Solids | Average Filtrate Suspended Solids | Average Percent Removal |
|---|---|---|---|---|
| 4 inches 60 ppi (Z-type) | 10 | 26 ppm | 22 ppm | 15% |
| 4 inches 100 ppi (Z-type) | 10 | 26 ppm | 11 ppm | 58% |

However, an increased surface area alone does not lead to higher removal efficiency if, at the same time, microeddy formation is decreased. This fact is shown by experimentation reported in the following Table V.

TABLE V

| Foam Matrix | Flow Rate (gfm) | Average Feed Suspended Solids | Average Filtrate Suspended Solids | Average Percent Removal |
|---|---|---|---|---|
| 2 inches each of 100/60/100/100 ppi (Z-type) | 10 | 30 ppm | 6 ppm | 80% |
| 2 inches each of 60/100/100/100 ppi (Z-type) | 10 | 30 ppm | 7 ppm | 77% |
| 2 inches each of 100/100/100/100 ppi (Z-type) | 10 | 22 ppm | 8 ppm | 64% |

It has a larger surface area than the other two systems, but it also has a lower solids removal effectiveness than the other two because of decreased microeddy formation. The foregoing data also show that a change in pore size is desirable for effective solids removal. This is believed due to an increase in microeddy formation at the foam wall. In all cases, the individual foam thicknesses were layered to provide for random orientation of the pores as previously discussed.

EXAMPLE 5

One of the important factors in the mechanism involved in the process of this invention is believed to be electrostatic attraction. If the charge on the solid particles is changed from negative to zero or slightly positive, such solids cannot be removed by the process of this invention. This is shown by adding a large dose of Reten 304, a cationic retention aid to a secondary effluent containing 32 ppm average feed suspended solids. The amount of Reten 304 added was 13.3 ppm. The foam matrix employed was two inches each of 60/100/100 ppi type Z polyurethane foam. No suspended solids removal occurred.

EXAMPLE 6

To show that a foam bed depth of greater than about 6 inches is not necessary, a test was run under identical conditions except for the foam bed depth. The data obtained are shown in the following Table VI.

TABLE VI

| Foam Matrix | Flow Rate (gfm) | Average Feed Suspended Solids | Average Filtrate Suspended Solids | Average Percent Removal |
|---|---|---|---|---|
| 6 inches 80 ppi (Z-type) | 8 | 68 ppm | 45 ppm | 34% |
| 8 inches 80 ppi (Z-type) | 8 | 68 ppm | 44 ppm | 35% |

Unlike sand filters or multi-media filters where removal efficiency increases with depth, it has been found that it is not necessary in the practice of this invention to have a filter bed depth greater than about 6 inches.

EXAMPLE 7

The flow rate obtainable with the process of this invention is quite high compared to general filtration techniques. The following data, presented in Table VII, show that the flow rate can be increased from 2 gfm to 10 gfm without any noticeable change in removal effectiveness.

TABLE VII

| Foam Matrix | Flow Rate (gfm) | Average Feed Suspended Solids | Average Filtrate Suspended Solids | Average Percent Removal |
|---|---|---|---|---|
| 2 inches each of 80/100/100 ppi | 2 | 54 ppm | 22 ppm | 59% |
| 2 inches each of 80/100/100 ppi | 4 | 54 ppm | 24 ppm | 56% |
| 2 inches each of 80/100/100 ppi | 6 | 54 ppm | 22 ppm | 59% |
| 2 inches each of 80/100/100 ppi | 8 | 65 ppm | 23 ppm | 57% |
| 2 inches of each 80/100/100 ppi | 10 | 54 ppm | 21 ppm | 61% |

EXAMPLE 8

The following data are illustrative of the relatively long breakthrough times attainable in the process of this invention.

A paper mill secondary effluent having average free suspended solids of 36 ppm was allowed to flow at a rate of 10 gfm through a foam matrix consisting of two inches each of 100/60/100/100 ppi of type Z polyurethane foam. The test ran 12 hours before breakthrough. Average filtrate suspended solids was 8 ppm and average percent removal was 78%.

A secondary effluent from paper mill processing containing 52 ppm of average feed suspended solids was permitted to flow at a rate of 10 gfm through a foam matrix consisting of six inches of 80 ppi type Q polyurethane foam. The effluent ran for 17 hours before breakthrough. The average filtrate suspended solids was 7 ppm for an average percent removal rate of 87%.

EXAMPLE 9

Since most waste treatment systems add polymers to aid in coagulation and settling suspended solids, the effect of polymer addition was studied. As shown in the following Table IX, addition of one and two ppm of Chitosan did not effect filtration effectiveness.

TABLE IX

| Foam Matrix | Flow Rate (gfm) | Average Feed Suspended Solids | Average Filtrate Suspended Solids | Average Percent Removal |
|---|---|---|---|---|
| 2 inches each of 60/100/100 ppi (Z-type) | 7.6 | 50 ppm | 31 ppm | 38% |
| 2 inches each of 60/100/100 ppi (Z-type) | 7.6 | 50 ppm | 29 ppm | 42% |
| Added 1 ppm Chitosan to secondary effluent before filtration | | | | |
| 2 inches each of 60/100/100 ppi (Z-type) | 7.6 | 50 ppm | 30 ppm | 40% |
| Added 2 ppm Chitosan to secondary effluent before filtration | | | | |

EXAMPLE 10

The process of this invention has also been discovered to reduce the chemical oxygen demand (COD) of the secondary effluent by from 10 to 20% and the biochemical oxygen demand (BOD) by from 40 to 60%. Data in support of these reductions are shown in the following Table X.

TABLE X

| Sample Description | $BOD_5$ | Reduction in $BOD_5$ | COD | Reduction in COD |
|---|---|---|---|---|
| Secondary Effluent | 10.6 | — | 260 | — |
| Filtrate After 6 inches 80 ppi (Q-type) | 6.4 | 40% | 240 | 8% |
| Secondary Effluent | 10.5 | — | 325 | — |
| Filtrate After 6 inches 80 ppi (Q-type) | 4.0 | 62% | 270 | 17% |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The method of removing fine suspended solids from an effluent stream comprising passing said stream through at least two contiguous layers of an open-celled compressible hydrophobic polymeric material and compressing said layers to remove the solids loaded therein to regenerate said material, said layers being spaced so that the open-celled pores of each layer are randomly oriented with respect to the pores of each adjacent layer.

2. The method of claim 1 wherein the polymeric material is selected from a polyurethane, a styrene-butadiene rubber, or foam rubber having from about 60 to 100 pores per lineal inch.

3. The method of claim 2 wherein the polymeric material is a reticulated polyester polyurethane foam of the Q-type or the Z-type having from about 60 to about 100 pores per lineal inch.

4. The method of claims 1, 2, or 3, wherein the layer of polymeric material through which the effluent stream is first passed has a larger number of pores per lineal inch than the contiguous downstream layer.

5. The method of claims 1, 2, or 3 wherein the effluent stream is a paper mill secondary effluent and the polymeric material is compressed at breakthrough to regenerate the foam.

6. The method of claims 1, 2, or 3 wherein the combined thickness of the contiguous layers of polymeric material is from about 4 to 8 inches with each layer being from about one to two inches in thickness.

7. The method of removing fine suspended solids from a paper mill secondary effluent comprising passing said effluent through a plurality of contiguous layers of a reticulated polyester polyurethane foam of the Q-type having from about 60 to about 100 pores per lineal inch and compressing said layers when they no longer are capable of removing solids from said effluent to remove solids loaded therein to regenerate said layers, said layers being spaced so that the open-celled pores of each layer are randomly oriented with respect to the pores of each adjacent layer and at least two layers have a different number of pores per lineal inch.

8. The method of claim 7 wherein the combined thickness of the contiguous layers of polyurethane foam is from about 6 to 8 inches with each layer being from about one to two inches in thickness.

9. The method of claim 7 or 8 wherein the layer of polyurethane foam through which the secondary effluent is first passed has 60 to 80 pores per lineal inch and the contiguous downstream layer has a greater number of pores per lineal inch.

10. The method of claims 7 or 8 wherein there are three contiguous layers of polyurethane foam, each of equal thickness, with the middle layer having a smaller number of pores per lineal inch than the outer layers.

11. The method of removing fine suspended solids from a paper mill secondary effluent comprising passing said effluent through a plurality of contiguous layers of a reticulated polyester polyurethane hydrophobic foam of the Q-type having from about 60 to about 100 pores per lineal inch and compressing said layers when they no longer are capable of removing solids from said effluent to remove solids loaded therein to regenerate said layers, said layers being spaced so that the open-celled pores of each layer are randomly oriented with respect to the pores of each adjacent layer.

12. The method of claim 11 wherein the combined thickness of the contiguous layers of polyurethane hydrophobic foam is from about 6 to 8 inches with each layer being from about 1 to 2 inches in thickness.

13. The method of claim 11 or 12 wherein the layer of polyurethane hydrophobic foam through which the secondary effluent is first passed has 60 to 80 pores per lineal inch and the contiguous downstream layer has a greater number of pores per lineal inch.

14. The method of claim 11 or 12 wherein there are three contiguous layers of polyurethane hydrophobic foam, each of equal thickness, with the middle layer having a smaller number of pores per lineal inch than the outer layers.

* * * * *